(12) United States Patent
Zajac et al.

(10) Patent No.: US 9,074,526 B2
(45) Date of Patent: Jul. 7, 2015

(54) SPLIT CYCLE ENGINE AND METHOD WITH INCREASED POWER DENSITY

(75) Inventors: John Zajac, San Jose, CA (US); Joseph Moran, Los Altos, CA (US)

(73) Assignee: Zajac Optimum Output Motors, Inc., San Jose, CA (US)

( * ) Notice: Subject to any disclaimer, the term of this patent is extended or adjusted under 35 U.S.C. 154(b) by 1063 days.

(21) Appl. No.: 13/157,132

(22) Filed: Jun. 9, 2011

(65) Prior Publication Data

US 2011/0303185 A1    Dec. 15, 2011

Related U.S. Application Data

(60) Provisional application No. 61/353,572, filed on Jun. 10, 2010.

(51) Int. Cl.
 *F02B 41/06* (2006.01)
 *F02B 41/02* (2006.01)
 *F02B 19/14* (2006.01)

(52) U.S. Cl.
 CPC .............. *F02B 41/06* (2013.01); *Y02T 10/42* (2013.01); *F02B 41/02* (2013.01)

(58) Field of Classification Search
 CPC .................................................. Y02T 10/42
 USPC .................... 60/39.6, 39.63; 123/70 R
 See application file for complete search history.

(56) References Cited

U.S. PATENT DOCUMENTS

| | | | |
|---|---|---|---|
| 4,759,188 A * | 7/1988 | Schatz | 60/605.1 |
| 4,783,966 A * | 11/1988 | Aldrich | 60/622 |
| 5,522,356 A * | 6/1996 | Palmer | 123/236 |
| 5,709,188 A * | 1/1998 | Al-Qutub | 123/204 |
| 5,785,015 A * | 7/1998 | Philippe et al. | 123/70 R |
| 6,092,365 A * | 7/2000 | Leidel | 60/39.63 |
| 6,543,225 B2 * | 4/2003 | Scuderi | 60/597 |
| 6,578,538 B2 * | 6/2003 | Trentham | 123/190.2 |
| 6,722,127 B2 * | 4/2004 | Scuderi et al. | 60/597 |
| 7,255,082 B2 | 8/2007 | Zajac et al. | |
| 7,353,786 B2 | 4/2008 | Scuderi et al. | |
| 7,415,947 B2 | 8/2008 | Zajac | |
| 7,434,551 B2 | 10/2008 | Zajac et al. | |
| 7,481,189 B2 | 1/2009 | Zajac | |
| 7,603,970 B2 | 10/2009 | Scuderi et al. | |
| 7,658,169 B2 | 2/2010 | Zajac et al. | |
| 2006/0243229 A1 * | 11/2006 | Zajac | 123/70 R |
| 2007/0289562 A1 * | 12/2007 | Zajac et al. | 123/51 R |

* cited by examiner

*Primary Examiner* — Hieut Vo
*Assistant Examiner* — Arnold Castro
(74) *Attorney, Agent, or Firm* — Edward S. Wright

(57) ABSTRACT

Split cycle engine and method in which output power and power density are increased in some embodiments with a turbocharger or supercharger which increases the pressure in the compression cylinder and also increases the power output of the engine without a corresponding decrease in the efficiency of the engine (work done per unit fuel). In other embodiments, the engine is used for braking, and the energy produced by braking is stored pneumatically and then used in driving the compressor.

21 Claims, 2 Drawing Sheets

SPLIT CYCLE ENGINE AND METHOD WITH INCREASED POWER DENSITY

RELATED APPLICATIONS

Provisional Application No. 61/353,572, filed Jun. 10, 2010, the priority of which is claimed.

BACKGROUND OF THE INVENTION

1. Field of Invention

This invention pertains generally to internal combustion engines and, more particularly, to a split cycle engine and method in which the power output and power density (HP/cu-in displacement) are increased without significantly reducing fuel efficiency.

2. Related Art

Heretofore, superchargers and turbochargers have been utilized in the air intake systems of internal combustion engines. While such blowers can increase the pressure and power output of an engine, they also produce higher exhaust pressures which waste energy and often reduce the overall efficiency of the engine.

Another way to increase power with an internal combustion engine is to add a replenishable power system, as is currently done in hybrid vehicles where electric motors supplement the internal combustion engines. The efficiency of such systems is improved by using energy produced by braking of the vehicle to generate electric power to recharge the batteries that operate the motor. Thus, the energy to stop a vehicle is no longer wasted but instead is recaptured to assist in the propulsion of the vehicle.

While hybrids can and do provide gains both in fuel efficiency and in power, these gains are offset by significant cost increases and added maintenance. With electric hybrids, the system requires two complete drive systems, which means additional weight as well as increases in cost and maintenance. Moreover, the cost and weight of the battery systems used in electric hybrids are substantial, and proper disposition of batteries that are worn out and no longer in use is a major concern.

OBJECTS AND SUMMARY OF THE INVENTION

It is, in general, an object of the invention to provide a new and improved internal combustion engine and method in which power density is increased without significant increases in cost or loss of efficiency.

Another object of the invention is to provide an engine and method of the above character which includes an inexpensive, regenerative hybrid system.

These and other objects are achieved in accordance with the invention by providing a split cycle engine and method in which air is compressed in a compression chamber, compressed air from the compression chamber is delivered to a combustion chamber where it is mixed with fuel in the combustion chamber to form a mixture which burns and expands, expanding gases from the combustion chamber are delivered to an expansion chamber to drive an output member, and the amount of air supplied to the compression chamber and, hence, the amount of air flowing through the rest of the engine is increased to increase the power output of the engine without a corresponding decrease in the efficiency of the engine.

In some embodiments, the pressure of the air delivered to the compression chamber is increased with a blower such as a supercharger or a turbocharger, and in others, the amount of air is increased by operating the engine in a hybrid mode in which the engine is operated in a braking mode as well as in a power mode. During the braking mode, air is drawn into the compression chamber, compressed, and stored in a pneumatic storage tank. During the power mode, compressed air from the storage tank is returned to the intake side of the compression chamber where it drives a compression piston during an intake stroke. The amount of air returned to the chamber can be controlled to make work done on the piston by the air either equal to or greater than the work done by the piston during a compression stroke.

DETAILED DESCRIPTION

Figure 1:
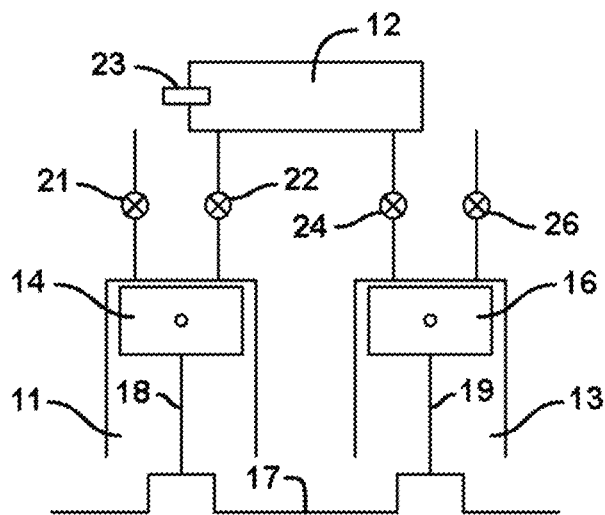
FIG. 1 is a simplified schematic diagram of one embodiment of a split cycle internal combustion engine according to the invention.

The split cycle engine illustrated in FIG. 1 has a compression cylinder 11, a combustion chamber 12, and an expansion cylinder 13, with reciprocating pistons 14, 16 in the compression and expansion cylinders forming chambers of variable volume. The pistons are connected to a crankshaft 17 by connecting rods 18, 19 for movement in concert between top dead center (TDC) and bottom dead center (BDC) positions in the cylinders, with each of the pistons making one upstroke and one downstroke during each revolution of the crankshaft.

Compression cylinder 11 receives fresh air through an intake valve 21 and communicates with the inlet end of combustion chamber 12 through an outlet valve 22. Fuel is injected into the combustion chamber through a fuel injector 23 or other suitable fuel inlet, where it is mixed with the air from the compression cylinder. The mixture burns and expands in the combustion chamber, and the expanding gas flows into the expansion cylinder from the outlet end of the combustion chamber through an inlet valve 24. Exhaust gas is discharged from the expansion cylinder through an exhaust valve 26. An engine of this general type is described in greater detail in U.S. Pat. No. 7,415,947, the disclosure of which is incorporated herein by reference.

A combustion chamber which is particularly suitable for use in this embodiment and others is described in detail in U.S. Pat. No. 7,434,551, the disclosure of which is also incorporated herein by reference. That chamber is elongated and, in some embodiments, folded back upon itself, with a rough, twisting interior side wall. In others, it is straight. The chamber is a double wall structure which can have an outer wall of structurally strong material such as steel and/or a composite material and a liner of thermally insulative ceramic material or an inner wall of structurally strong material and an outer wall of thermally insulative ceramic material. In some embodiments, a flow separator divides the combustion chamber into one or more smaller sections where fuel can mix and burn with only a portion of the air introduced into the chamber, with additional air being mixed with the burning mixture downstream to provide an overall mixture that is effectively leaner. Some embodiments have flow turbulators to promote complete mixing and combustion of the fuel and air, and some have long, sharp protrusions that extend inwardly from the side wall and form hot spots which help to provide complete combustion of the fuel mixture throughout the chamber.

The valves can be rotary valves, electronic valves, or other suitable valves which permit a wide range of adjustment in the timing of the valves. A rotary valve system which is particularly suitable for use in this embodiment and others is described in detail in U.S. Pat. No. 7,255,082, the disclosure of which is also incorporated herein by reference. The opening or closing positions of the valves can be varied independently of each other, i.e., the opening positions can be adjusted without affecting the closing positions, or the closing positions can be adjusted without affecting the opening positions. In addition, the intake, outlet, inlet, and exhaust valves can all be adjusted independently of each other and while the engine is running. This full adjustability of the valve system permits continuous matching of engine performance with every combination of load and speed.

Unlike the poppet valves traditionally used in conventional Otto and Diesel engines, the valves employed in the invention do not protrude into the cylinders when they are open. Consequently, the engine can have nearly perfect volumetric efficiency, with the volume above the pistons being very close to zero both at the end of the compression stroke and at the beginning of the expansion stroke. Having the minimum volumes of the cylinders near zero allows for significant improvement in the efficiency of the engine.

With valves that do not protrude into the cylinders, the only limitation to full piston travel is the need for a small tolerance or clearance to prevent the pistons from striking the head due to thermal expansion or extension at higher engine speeds. This clearance can, for example, be on the order of about 0.010 inch to 0.200 inch, and typically does not need to be more than about 0.015 inch. Hence, the minimum volumes of the cylinders can be much closer to zero than they are in other engines.

Moreover, unlike conventional reciprocating piston engines where combustion takes place in the same cylinders as compression and expansion, the travel of the piston toward the top of the cylinder is not limited by the compression ratio. In a conventional engine, that ratio is determined by the ratio of the cylinder volume at bottom dead center (BDC) to the volume at top dead center (TDC), and the need to keep the ratio below a certain level to avoid predetonation limits how close the pistons can come to the cylinder heads. In the engine of the invention, where the compression ratio is determined primarily by the timing of the valves and combustion occurs outside the compression cylinder, the compression ratio does not limit the travel of the pistons, and the compression piston can travel almost completely to the head because the outlet valve is opened to discharge the compressed air to the combustion chamber once the correct pressure has been achieved.

The engine runs because the product of the volume and the pressure of the gas sent to the expansion cylinder is greater than the product of the pressure and the volume of the air delivered to the combustion chamber from the compression cylinder. Ignoring losses, the gas entering the expansion cylinder is at the same pressure as the air leaving the compression cylinder, but at a greater volume by an amount proportional to the rise in temperature in the combustion chamber. That rise is proportional to the amount of fuel injected into the combustion chamber.

The burning of fuel in the engine can easily result in a volumetric expansion of 2:1, which suggests that the expansion cylinders should have twice the volume of the compression cylinders. This can be accomplished by using a greater bore and/or stroke in the expansions cylinders, by using a greater number of expansion cylinders, or by a combination thereof. While that would work well at full load, it would not be as efficient when the engine is operating at less than full load. Efficiency would be compromised most of the time since engines are rarely operated at 100% of their maximum load capability. In the invention, the sizes of the two pistons can be made equal, as can their strokes, which maintains good mechanical balance, and the amount of air intake can be varied to match the specific needs of the engine under different operating conditions. Thus, for example, with equal numbers of compression and expansion cylinders, pistons of equal size and stroke, and a maximum expansion ratio of 2:1 at full load, the air intake to the compressor is limited to about 50%. If the expansion ratio at full load is other than 2:1, then the amount of air intake can be adjusted accordingly, e.g. 40% for a ratio of 2.5:1. With lesser loads and lower power output, less air can be compressed, and less air requires less fuel to produce the same percent of expansion. Less air and less fuel produce less net power for smaller loads. Since the engine recaptures compressed air and work done against atmospheric pressure, there is no decrease in efficiency at partial loads.

The engine is not, however, limited to having equal numbers of compression and expansion cylinders and pistons of equal size and stroke. It can have any combination of cylinders and piston sizes and strokes desired and, by adjustment of the air intake and other valves, still maintain optimum efficiency throughout its operating range. The engine can also have more than one combustion chamber between the compression and expansion cylinders, if desired.

The engine can have virtually any compression ratio because, unlike an Otto cycle engine, there is no fuel to predetonate in the cylinder doing the compression, which would limit the compression ratio to about 10:1, and unlike a typical Diesel engine, the compression ratio does not have to be higher than about 18:1 in order to generate enough heat to ensure detonation. The engine can operate with a compression ratio anywhere in the range of about 6:1 to 24:1, but has the greatest efficiently with a ratio of about 10:1 to 18:1, although to prevent $NO_x$ from forming, the maximum temperature should be held to about 1700° K-1800° K. Under those conditions, the engine produces maximum fuel efficiency with a compression ratio in the range of about 10:1 to 18:1. The engine can also operate at other compression ratios, but possibly not as efficiently. In areas where $NO_x$ pollution standards are not as stringent, the efficiency of the engine can be increased by the use of a higher compression ratio and a higher maximum temperature.

The compression ratio is controlled by the timing of the intake, outlet and inlet valves. In typical operation, the outlet valve opens when the pressure above the piston in the compression cylinder equals the pressure in the combustion chamber. In an engine having a 9:1 compression ratio in which the compression cylinder is allowed to have a full charge of air, the outlet valve opens when the piston has completed slightly more than 90% of its upward travel toward top dead center. For other compression ratios on the order of 10:1 to 18:1, the outlet valve is opened when the compression piston has completed about 90% to 95% of its upward travel, with the point of opening being higher at higher compression ratios. If the compression cylinder is not allowed to have a full charge of air, then the pressure within the cylinder will rise more slowly, and the outlet valve will open later in the upward stroke. Regardless of when the outlet valve is opened, it closes at or near top dead center for maximum efficiency.

In a standard Otto (gasoline) or Diesel engine, each cylinder provides compression and power, and each cylinder provides one power pulse every other cycle. Thus, an eight-cylinder engine, for example, produces four power strokes for each revolution of the crankshaft, and while adding a turbocharger may increase power density, there are still only four power strokes per revolution. That, however, is not the case with the engine of the invention where the burning gas expands between the compression and expansion cylinders and the volume of the expansion cylinders is greater than the volume of the compressors.

Figure 2:
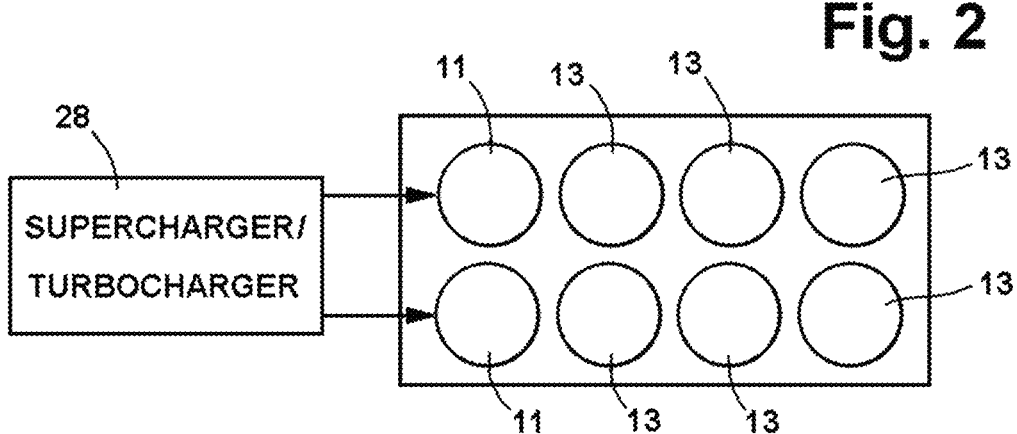
FIG. 2 is a simplified schematic diagram of an eight cylinder split cycle internal combustion engine incorporating the invention.

FIG. 2 illustrates an embodiment in which the engine has eight cylinders of equal volume, with six of the cylinders being used as expanders 13 and only two of them being used as compressors 11. A blower 28 in the form of either a supercharger or a turbocharger is provided at the input of the two compression cylinders to increase the pressure and, hence, the amount of air in the compressors, and with more air in the compressors, the volume or mass of air moving through the rest of the engine is also increased.

With cylinders of equal displacement and a burn temperature that is approximately twice the compression temperature, the two compressors would provide only enough air to operate four of the expanders at full power without the blower or to operate the six expanders at less than full power. However, with the blower increasing the pressure of the air entering the compressors from atmospheric pressure (1.0 bar) to 1.5 bar, the two compressors provide the air for all six of the expanders to operate at full power. Thus, with or without the boost, the invention can provide six power strokes per revolution in an eight cylinder engine, albeit at reduced power without the blower, whereas a conventional eight cylinder engine can provide only four.

The work required to be done by the blower in raising the pressure of the incoming air from 1.0 bar (atmospheric pressure) to 1.5 bar is relatively insignificant since a pressure of 1.5 bar is easy to provide, and the compression pistons do the vast majority of the compression. Moreover, unlike other engines, the blower does not increase the burn pressure or significantly increase the exhaust pressure, and high efficiency is maintained.

The amount of air supplied by the blower is preferably chosen to be such that it allows the larger volume of expanders to operate at full power even with a small compression volume. The optimal size of the blower is dependent upon the total compression ratio, the burn temperature, and the ratio of compressor volume to expander volume. As that ratio decreases, the blower volume required for the same power output increases, and with fewer compressors and more expanders, a larger blower or a plurality of blowers is or are required.

These relationships are applicable both when running at maximum efficiency, with exhaust pressures close to atmospheric pressure, and at higher power output levels where efficiency is less, more air needs to be supplied by the blower or compressor pistons, and the exhaust pressure is more than just a few PSI above atmospheric pressure.

When operating under low load conditions, the blower is not used, and either all six of the power cylinders are operated at reduced power or four of the cylinders are operated at full power. Then when more power is needed, the blower provides an increase in air flow at low pressure, and all of the power cylinders are used at fuller capacity. When the blower is not used, it is generally easier and preferable to use all six expanders even though each of them will be operating at less than full power. The power cylinders can be idled or taken out of use simply by keeping their inlet valves closed.

The power output or power density of this engine can also be increased by using a lower compression ratio which lowers the compression temperature and, thus, requires more fuel to get to the same maximum burn temperature. This will cause an increase in the exhaust pressure, which in turn increases the power output of the engine for the same displacement. The trade off in this case is that although the power density goes up, the increased fuel use and higher exhaust pressure will cause a modest decrease in fuel efficiency.

The efficiency of the engine can be maximized by opening the inlet valve between the combustion chamber and the expander after the outlet valve between the compressor and the combustion chamber is closed so that combustion occurs essentially at constant volume conditions. This will produce a very slight increase in the pressure in the combustion chamber, but this increase is insignificant since the volume of the compression chamber is large in comparison with the volume of the compressed gas coming from the compressor. This pressure pulse can be dampened out, or averaged out by the instruments and the controlling computer to produce a pressure reading that is useable for engine control.

By way of example, if the volume of the combustion chamber (including the chamber itself and all passageways between the outlet valve and the inlet valve) is thirty times the volume of the compressor when the outlet valve opens, then at a compression pressure of 600 PSI the combustion pressure would go up in the order of 20 PSI when the compressor gas is injected into the combustion chamber and another 20 PSI as it is heated in the chamber. This pressure would be reduced to 600 PSI when gas is allowed into the expanders. Thus, valve timing can be used to provide a true constant volume burn condition for maximum efficiency.

Figure 3:
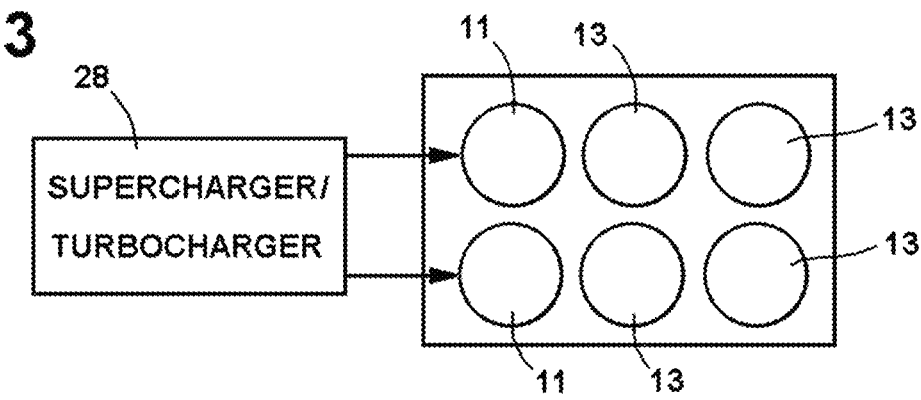
FIG. 3 is a simplified schematic diagram of a six cylinder split cycle internal combustion engine incorporating the invention.

FIG. 3 illustrates an embodiment which is generally similar to the embodiment of FIG. 2 except, in this embodiment, the engine has six cylinders of equal volume, with four of the cylinders being used as expanders 13 and two being used as compressors 11. It also has a supercharger or turbocharger 28 for increasing the pressure and, hence, the amount of air delivered to the compressors and the volume or mass of air moving through the rest of the engine.

In this embodiment, with cylinders of equal displacement and a burn temperature that is approximately twice the compression temperature, the two compressors provide enough air to operate all four of the expanders at full power without the blower. With the blower increasing the pressure of the air entering the compressors from atmospheric pressure (1.0 bar) to 1.5 bar, the output power of the engine is increased by about 50 percent. Thus, with or without the boost, a six cylinder engine incorporating the invention can provide four full power strokes per revolution, whereas a conventional six cylinder engine can provide only three.

Figure 4:
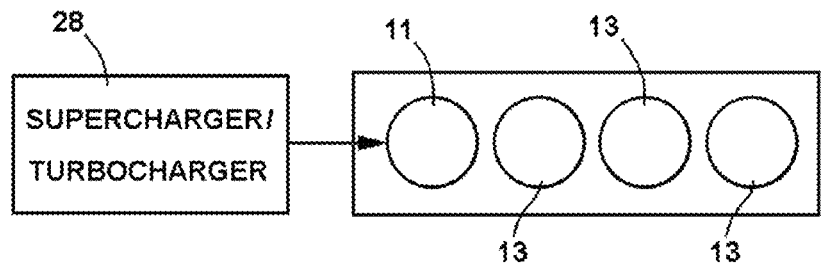
FIG. 4 is a simplified schematic diagram of a four cylinder split cycle internal combustion engine incorporating the invention.

FIG. 4 illustrates an embodiment which is generally similar to the embodiments of FIGS. 2 and 3 except, in this embodiment, the engine has four cylinders of equal volume, with three of the cylinders being used as expanders 13 and only one being used as a compressor 11. It includes a supercharger or turbocharger 28 for increasing the pressure and, hence, the amount of air delivered to the compressor and the volume or mass of air moving through the rest of the engine.

With cylinders of equal displacement and a burn temperature that is approximately twice the compression temperature, the compressor would provide only enough air to operate two of the expanders at full power without the blower or to operate all three expanders at less than full power. However, with the blower increasing the pressure of the air entering the compressors from atmospheric pressure (1.0 bar) to 1.5 bar, the compressor provides the air for all three of the expanders to operate at full power. Thus, with or without the boost, a four cylinder engine incorporating the invention can provide three power strokes per revolution, albeit at reduced power without the blower, whereas a conventional four cylinder engine can provide only two.

Figure 5:
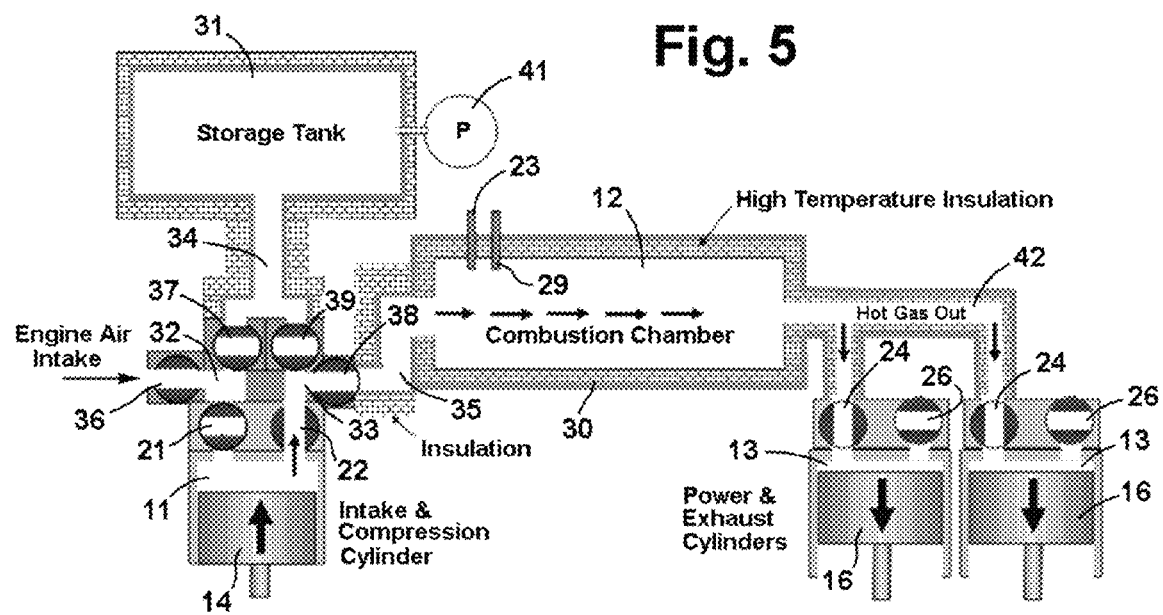
FIG. 5 is a cross-sectional view, somewhat schematic, of another embodiment of a split cycle internal combustion engine incorporating the invention.

FIG. 5 illustrates a pneumatic hybrid embodiment of the engine which has a pneumatic storage tank and associated valving in addition to the components in the embodiment of FIG. 1. Thus, the engine has a compression cylinder 11, a combustion chamber 12, and two expansion or power cylinders 13, 13, with reciprocating pistons 14, 16 in the compression and expansion cylinders. Fuel is injected into the combustion chamber through a fuel injector 23 or other suitable fuel inlet, where it is mixed with the air from the compression cylinder and ignited by a spark plug or glow plug 29. High temperature insulation 30 on the combustion chamber prevents loss of heat from the burning mixture.

The storage tank 31 is connected to compression cylinder 11 by manifolds 32, 33. Manifold 32 provides communication between the air intake, the compression cylinder, and an insulated passageway 34 between the manifolds and the storage tank. Manifold 33 provides communication between the compression cylinder, combustion chamber 12, and passageway 34, with another insulated passageway 35 between manifold 33 and the combustion chamber. The volumes of the manifolds and the lengths of the passageways are made as small as possible in order to minimize volumetric losses and heat losses in them.

Intake valve 21 controls communication between compression cylinder 11 and manifold 32, and additional valves 36, 37 are provided at the air inlet and in the branch of manifold 32 leading to passageway 34 to control communication between the air intake and between the manifold and the storage tank. Similarly, outlet valve 22 controls communication between compression cylinder 11 and manifold 33, while additional valves 38, 39 are provided in the branches of the manifold leading to combustion chamber 12 and passageway 34 to control communication between manifold 33 and the combustion chamber and between manifold 33 and the storage tank.

The storage tank is used for the storage of pneumatic energy. It has a pressure gauge 41 for measuring the pressure of the gas stored therein, and it is insulated to keep the compressed gas warm for as long as possible. This is important because the air was heated during compression, and allowing it to cool would allow the pressure in the storage tank to decrease and thereby waste much of the energy stored, decreasing the overall efficiency of pneumatic storage.

An expansion manifold 42 provides communication between the outlet end of combustion chamber 12 and expansion cylinders 13, with inlet valves 24 controlling the delivery of expanding gases from the combustion chamber to the expansion cylinders through this manifold. The discharge of exhaust gases from the expansion cylinders is controlled by exhaust valves 26.

While intake valve 21, outlet valve 22, inlet valves 24, and exhaust valves 26 are variable valves which open and close during each revolution of the engine, valves 36, 37, 38, and 39 determine the mode in which the engine is operating (e.g. normal operation, braking, pneumatic boost, etc.), and they open and close only upon a change in the mode of operation.

In normal operation, valves 36 and 38 are open, and valves 37 and 39 are closed, with air being drawn in to compression cylinder 11 through intake valve 21 during the down stroke of piston 14. On the up stroke, compressed air is pushed out of the compression cylinder through outlet valve 22 to the combustion chamber at a pressure which can, for example, be on the order of 600 psi. In the combustion chamber, the compressed air then heated to a temperature on the order of approximately 1700° K (1427° C., 2600° F.) and expanded into expansion cylinders 13 through inlet valves 24. With the expander having twice the volume of the compressor, and the compression and expansion stokes having essentially the same maximum and minimum pressures, the work output is twice the work input. Thus, for example, with a work input of 1 unit and a work output of 2 units, the net work output is 1 unit.

By varying the timing of intake valve 21 and outlet valve 22, the amount of air compressed by the compression cylinder can be adjusted to match loads on the engine, and the timing of inlet valves 24 and exhaust valves 26 can be varied to match the load requirements and to exhaust close to atmospheric pressure.

For braking, the engine is used instead of friction brakes to slow the vehicle down and produce energy that can be stored and used later to propel the vehicle either by accelerating it or by maintaining its movement at a given speed.

In this mode, valves 36 and 39 are open, and valves 37 and 38 are closed. Inlet valve 24 is closed to reduce pressure loss in the combustion chamber, and valve 26 is also closed unless maximum braking is desired. Intake valve 21 lets in air proportional to the amount of braking required, and valve 22 opens when the pressure in compression cylinder 11 is equal to the pressure storage tank 31. Pressure is allowed to build in the storage tank until braking is no longer required or maximum pressure is obtained.

Air from the storage tank can be used either to supply extra power to boost total power of the engine or to supply power without burning any or as much fuel as would be required under normal operation without pneumatic storage. Using the stored air to supply power with less or no fuel use significantly increases the efficiency of the engine and greatly improves the fuel efficiency (MPG) of the vehicle.

When using pneumatic storage in the substitution mode, valve 36 is closed, and valve 37 is opened long enough to allow a controlled amount of pressurized air to fill manifold 32. Then when valve 21 is opened, the pressurized air in the manifold does work against the compression piston. The work done against the piston is equal to the work of compression that the compression piston does on the up stoke, and the net work of compression is effectively zero. With the expander having twice the volume of the compressor and the work done by the compressor being 1 unit on the upstroke, the work output of the engine is still 2 units, but with the work of compression now being effectively zero, the net work output is now 2 units. Thus, in the pneumatic storage mode, the horsepower of the engine can be doubled. If less than a doubling of horsepower is desired, the amount of air provided from the storage tank can be varied via intake valve 21, and using less of the stored air allows the stored air to last for a longer period than when using a larger amount of it.

If greater power or acceleration is desired, the amount of boost provided by the pneumatic storage can be increased. Thus, for example, if twice the normal air pressure is provided into the compressor for the same degree of crankshaft rotation by leaving valve 37 open longer, then approximately twice the work of compression will be done on the down-stroke of the compressor piston. Intake valve 22 will now open sooner to force air out at the same 600 psi of pressure, and the work performed on the compression piston will be much greater than the work of pushing the air to the combustion chamber.

Thus, a net work gain of about 1 unit is realized in the compressor. Since the engine is a constant temperature engine, putting twice as much air into the combustion chamber results in using twice the normal amount of fuel. However, this doubling of the amount of air going in the combustion chamber results in twice the normal amount of air coming out which translates to about twice the work being done on the expansion pistons. With twice the optimum amount of air being supplied to the expanders at the same pressure, the air is not fully expanded, and instead of being exhausted at a couple of psi over atmospheric pressure, it is exhausted at about 18-20 psi over atmospheric pressure. This may require a muffler and is less efficient than lower boosts, but it can result in 500% as much power output as the normal mode where the engine is operating under the most efficient conditions (Power output=2(2)−(−1)=5 units of power). This is only one example of how the work output can be varied using pneumatic storage. Other levels of power output ranging from 1 unit to 10 units are possible with this engine.

For convenience and ease of illustration, the valves in the pneumatic system are shown as separate valves. However, it will be understood that two or more of these valves can be combined, if desired, to save cost and space. Thus, for example, valves 36 and 37 can be combined into a single three-way valve, as can valves 38 and 39.

The engine can also be implemented with other types of replenishable power systems, including an electric motor. However, the pneumatic hybrid is preferred because it is substantially less expensive, simpler, and lighter than an electric hybrid.

The invention has a number of important features and advantages. It provides an internal combustion engine and method in which power output and power density are increased without significant loss of efficiency or increased cost, and the pneumatic hybrid can produce power without burning fuel by running on air only, it can increase power output by over 500 percent compared to the normal mode of operation, and it can conserve stored energy by using stored pneumatic pressures lower than the normal operating pressure of the expanders. The pneumatic hybrid is substantially less expensive, simpler, and lighter than an electric hybrid. With no additional batteries, electric motors, or generators being required, the added cost and weight of the pneumatic hybrid are only about 20 percent of those of an electric hybrid, and the pneumatic hybrid never needs battery replacement.

The pneumatic hybrid adds only four valves and two small manifolds per engine, and uses storage tanks that are inexpensive, light in weight, and can be quickly connected and disconnected. The insulated tank and lines prevent compressed gas from cooling and losing pressure and available work, and there are no pistons in the pneumatic system to leak or require lubrication.

By varying the degree of crankshaft angle that the intake valve to the compressor is open, the pressure of the storage tank can be made to match the engine output needs over a wide range of pressures. Similarly, by varying the degree of crankshaft angle that the compressor inlet and outlet valves are open, the braking force and amount of pneumatic storage can be optimized.

Other methods of using compressed air to power the expanders, as in U.S. Pat. Nos. 7,353,786 and 7,603,970, for example require that the air supplied be at the normal delivery pressure. If the delivery pressure is less than normal, power output would suffer and, in the case of a diesel engine, ignition may not occur. However, in the engine of the invention, the same amount of air can still be delivered to the compressor even when the storage pressure is lower than the compressor output pressure by leaving the intake valve open for a longer period of time. This allows the engine to run longer on pneumatic stored energy, which is an important and desirable feature. In the pneumatic engine of the invention, the increase in total power available is also several times greater than in the method disclosed by the aforesaid patents, which is of enormous benefit for power burst applications in commercial and military use.

It is apparent from the foregoing that a new and improved split cycle engine and method have been provided. While only certain presently preferred embodiments have been described in detail, as will be apparent to those familiar with the art, certain changes and modifications can be made without departing from the scope of the invention as defined by the following claims.

The invention claimed is:

1. An internal combustion engine, comprising: a compression chamber of variable volume for compressing air taken into the engine, a combustion chamber for receiving compressed air from the compression chamber, means for introducing fuel into the combustion chamber to mix with air from the compression chamber and form a mixture which burns and expands, an expansion chamber having an output member which is driven by expanding gas from the combustion chamber, a tank for storing air compressed in the compression chamber during a braking mode of operation, and means for delivering air from the storage tank to the compression chamber to increase the amount of air supplied to the compression chamber and the power output of the engine.

2. The engine of claim 1 having two compression cylinders, a combustion chamber in which compressed air from the two compression cylinders is mixed with fuel and burned to produce hot expanding gases, and six expansion cylinders to which the expanding gases are delivered.

3. The engine of claim 1 having two compression cylinders, a combustion chamber in which compressed air from the two compression cylinders is mixed with fuel and burned to produce hot expanding gases, and four expansion cylinders to which the expanding gases are delivered.

4. The engine of claim 1 having a single compression cylinder and a plurality of expansion cylinders to which the expanding gases are delivered.

5. The engine of claim 4 having three expansion cylinders to which the expanding gases are delivered.

6. The engine of claim 1 wherein the expansion chamber volume is greater than the compression chamber volume, the expansion ratio of gas burning in the combustion chamber is less than the ratio of the expansion chamber volume to the compression chamber volume, and the increase in air supplied to the compression chamber allows operation at full power in the expansion chamber volume.

7. The engine of claim 1 including an outlet valve for controlling communication between the compression chamber and the combustion chamber, an inlet valve for controlling communication between the combustion chamber and the expansion chamber, and means for opening the inlet valve after the outlet valve is closed so that combustion occurs essentially at constant volume conditions.

8. The engine of claim 1 including an exhaust valve through which gas is discharged from the expansion chamber, and means for opening the exhaust valve when pressure in the expansion chamber is at or near atmospheric pressure.

9. An internal combustion engine, comprising:
 (a) a compression chamber of variable volume for compressing air taken into the engine;
 (b) a combustion chamber for receiving compressed air from the compression chamber;

(c) means for introducing fuel into the combustion chamber to mix with air from the compression chamber and form a mixture which burns and expands:

(d) an expansion chamber having an output member which is driven by expanding gas from the combustion chamber;

(e) a pneumatic storage tank; and (f) valving which controls communication between the compression chamber, an engine air intake, the storage tank and the combustion chamber to provide:

(i) a normal mode of operation in which air is drawn into the compression chamber from the engine air intake, compressed, and the compressed air is delivered to the combustion chamber from the compression chamber;

(ii) a braking mode in which air is drawn into the compression chamber from the engine air intake, compressed, and hot compressed air is delivered from the compression chamber to the storage tank; and (iii) a pneumatic boost mode in which hot compressed air is delivered to the compression chamber from the storage tank to drive a compression member during an intake stroke.

10. The engine of claim 9 including means for controlling the amount of hot compressed air delivered to the compression chamber so that work done by the air against the compression member during the intake stroke is less than or equal to the work of compression done by the compression member during a compression stoke.

11. The engine of claim 9 including means for controlling the amount of hot compressed air delivered to the compression chamber so that work done by the air against the compression member during the intake stroke is greater than the work of compression done by the compression member during a compression stoke.

12. The engine of claim 9 wherein the storage tank is insulated to prevent loss of heat from air stored therein.

13. An internal combustion engine, comprising: separate compression and expansion cylinders of variable volume with an overall expander volume greater than the overall compressor volume, a combustion chamber of constant volume in which compressed air from the compression cylinders is mixed with fuel and burned to produce expanding gases having a volume which is greater than the volume of the compressed air entering the chamber but less than the overall expander volume, means for delivering the expanding gases to the expansion cylinders to drive pistons therein, a tank in which air compressed in the compression cylinders during a braking mode of operation is stored, and means for delivering air from the tank to the compression cylinders to increase the amount of air entering the combustion chamber and the volume of the gases delivered to expansion cylinders to a level equal to or greater than the overall expander volume.

14. The engine of claim 13 including an outlet valve for controlling communication between the compression cylinders and the combustion chamber, an inlet valve for controlling communication between the combustion chamber and the expansion cylinders, and means for opening the inlet valve after the outlet valve is closed so that combustion occurs essentially at constant volume conditions.

15. A method of operating an internal combustion engine, comprising the steps of: compressing air in a compression chamber, delivering compressed air from the compression chamber to a combustion chamber, mixing the compressed air with fuel in the combustion chamber to form a mixture which burns and expands, delivering expanding gases from the combustion chamber to an expansion chamber to drive an output member in the expansion chamber, operating the engine in a braking mode to compress air in the compression chamber, storing hot compressed air from the compression chamber in a storage tank, and delivering hot compressed gas air from the storage tank to the compression chamber during an intake stroke, thereby increasing the amount of air supplied to the compression chamber and, hence, the amount of air flowing through the rest of the engine to increase the power output of the engine.

16. The method of claim 15 wherein the amount of hot compressed air delivered to the compression chamber is such that work done by the air against the compression member during the intake stroke is less than or equal to the work of compression done by the compression member during a compression stoke.

17. The method of claim 15 wherein the amount of hot compressed air delivered to the compression chamber is such that work done by the air against the compression member during the intake stroke is greater than the work of compression done by the compression member during a compression stoke.

18. The method of claim 15 wherein the expansion chamber volume is greater than the compression chamber volume, the expansion ratio of gas burning in the combustion chamber is less than the ratio of the expansion chamber volume to the compression chamber volume, and the increase in air supplied to the compression chamber allows operation at full power in the entire expansion chamber volume.

19. The method of claim 15 further comprising the steps of controlling communication between the compression chamber an the combustion chamber with a first valve, controlling communication between the combustion chamber and the expansion chamber with a second valve, and opening the second valve after the first valve is closed so that combustion occurs essentially at constant volume conditions.

20. An internal combustion engine, comprising: a compression chamber of variable volume for compressing air taken into the engine, a combustion chamber for receiving compressed air from the compression chamber, means for introducing fuel into the combustion chamber to mix with air from the compression chamber and form a mixture which burns and expands, an expansion chamber having an output member which is driven by expanding gas from the combustion chamber, a tank in which compressed air is stored, and means for delivering air from the storage tank to the compression chamber to increase the amount of air supplied to the compression chamber and the power output of the engine.

21. A method of operating an internal combustion engine, comprising the steps of: compressing air in a compression chamber, delivering compressed air from the compression chamber to a combustion chamber, mixing the compressed air with fuel in the combustion chamber to form a mixture which burns and expands, delivering expanding gases from the combustion chamber to an expansion chamber to drive an output member in the expansion chamber, storing hot compressed air in a storage tank, and delivering hot compressed air from the storage tank to the compression chamber during an intake stroke, thereby increasing the amount of air supplied to the compression chamber and, hence, the amount of air flowing through the rest of the engine to increase the power output of the engine.

* * * * *